United States Patent [19]
Presnell

[11] Patent Number: 6,026,653
[45] Date of Patent: Feb. 22, 2000

[54] MARINE AIR CONDITIONER

[76] Inventor: David M. Presnell, 101 S. Monterey, Mobile, Ala. 36604

[21] Appl. No.: 08/855,475

[22] Filed: May 13, 1997

[51] Int. Cl.[7] .......................................... F25D 3/02
[52] U.S. Cl. .............................. 62/177; 62/420
[58] Field of Search .............................. 62/420–423, 177

[56] References Cited

U.S. PATENT DOCUMENTS

| 1,046,727 | 12/1912 | Blenz et al. | 62/420 |
| 4,841,742 | 6/1989 | Biby | 62/420 |
| 5,685,165 | 11/1997 | Bigelow, Jr. | 62/420 |

FOREIGN PATENT DOCUMENTS

| 5-296503 | 11/1993 | Japan | 62/420 |

Primary Examiner—William E. Tapolcai
Attorney, Agent, or Firm—Papan Devnani, Esq.; Thomas Powers; Chandrakant C. Shroff

[57] ABSTRACT

An air conditioning apparatus suitable for use in small boats having enclosed cabins, comprising an insulated compartment; a cooling coil having an inner surface and an outer surface; a small pump for causing a liquid cooling fluid to travel along a defined flow path leading from the insulated compartment, across the inner surface of the cooling coil, and back to the insulated compartment; and a means for causing air to flow across the outer surface of the cooling coil in heat exchange relationship with the cooling fluid. The cooling fluid is cooled by contact with a slowly melting frozen material stored inside the insulated compartment. No on-board vapor compression refrigeration cycle like those used in conventional marine air conditioning systems is used for either chilling the cooling fluid or refreezing the frozen material after it melts. This leads to a significant decrease in power requirements.

9 Claims, 4 Drawing Sheets

MARINE AIR CONDITIONER

FIELD OF THE INVENTION

The invention is an apparatus for controlling the temperature and/or humidity of the air in an enclosed space. More particularly, the apparatus is an air conditioner which blows warm air over a cooling coil. Such a device is ideally suited for boats having enclosed cabins. The energy contained in ordinary ice is used to cool the cooling coil. The apparatus is ideally suited for small boats.

BACKGROUND OF THE INVENTION

The current air conditioning system is a marine air conditioning system for use in boats having enclosed cabins. Such systems in the prior art may be permanently installed or portable. The permanent systems are typically found on larger boats, while the portable systems are used on smaller boats.

Most permanently installed marine air conditioning systems are based on a conventional refrigeration cycle. Air from an enclosed cabin on a boat is blown through a cooling coil cooled with a refrigerant gas such as freon. A compressor is used to compress the freon. The cooling coil reduces the temperature of the air passing over it, and also causes water vapor carried by the air to condense on the cooling coil. Condensate is drained overboard. The air is then returned to the cabin. A fan is used to blow the air over the cooling coil. The compressor requires a significant source of electrical power, so that an onboard engine driven generator or dockside supply of electrical power is required to operate the system.

A variety of portable systems are also available. These systems are similar to the window air conditioners commonly used to cool residential spaces. These systems use a similar process of compressing a refrigerant gas such as freon, and then permitting it to expand within the cooling coil of a heat exchanger. This expansion reduces the temperature of the gas, and allows it to extract heat from air flowing across the external surface of the cooling coil. The portable unit is placed over an open deck hatch, and air from the boat cabin is then pumped across the cooling coil and back into the cabin. The compressor power requirements on the portable unit require that the portable unit be powered by a dockside power supply, as an on-board generator is impractical on the smaller boats on which the portable system will be used.

It is also possible to use ice to cool air. Typically, the ice is stored inside an ice storage chamber having walls that allow heat transfer, as shown in FIG. 1. A fluid such as air is made to flow across the external surface of the wall of the ice storage chamber. This places the fluid in thermal communication with the ice in the chamber. Heat flows from the fluid into the ice, cooling the fluid and melting the ice. The major drawback to this system is that the ice is normally used in the form of chips or cubes which leave air spaces between ice and the wall of the storage chamber. These air spaces can act as insulation, reducing the efficiency of heat transfer across the wall.

As shown in FIG. 2, it is possible to modify the system of FIG. 1 to prevent the ice in the storage chamber from melting. A cooling fluid circulates through a coil within the ice storage chamber. This places the cooling fluid in heat transfer relationship with the ice in the storage chamber. Heat received by the ice from the first fluid flows into the cooling fluid, cooling the contents of the ice storage chamber and refreezing the ice. A compressor then compresses the cooling fluid, and allows it to expand into the coil within the ice storage chamber. This system has the drawback that a great deal of power is required to operate the compressor, making this system economically unattractive.

It is an object of this invention to provide an air conditioning system which does not require that a refrigerant gas be compressed by a compressor. Instead, an ice-cooled liquid is circulated through a cooling coil by a small, battery-powered pump, greatly reducing the power requirements.

It is a further object of this invention to provide an air conditioning system using a circulating ice-cooled liquid as a refrigerant rather than solid ice. This results in an improvement in the efficiency of heat transfer.

SUMMARY OF THE INVENTION

The invention is an air conditioning apparatus which is suitable for cooling the atmosphere inside an enclosed cabin. It is ideally suited for cooling the air in the cabin of a private boat. The device uses the energy contained in a frozen liquid, such as ice, to cool a coolant liquid flowing through a heat exchanger, such as a hollow cooling coil. A supply of ice is stored in an insulated compartment, together with a small amount of water. The water, which has been chilled by contact with the ice, is drawn from the insulated compartment by a pump. The pump then forces the water to travel through a heat exchange coil, and then return to the insulated compartment. A fan pulls air across the cooling coil and circulates it within a space to be cooled. The ice in the insulated compartment is allowed to slowly melt over a period of time. No vapor compression refrigeration system is used to refreeze the melting ice. As a result, this system requires much less power to operate than conventional systems featuring a vapor compression refrigeration system.

DESCRIPTION OF THE PREFERRED EMBODIMENTS

Figure 1:
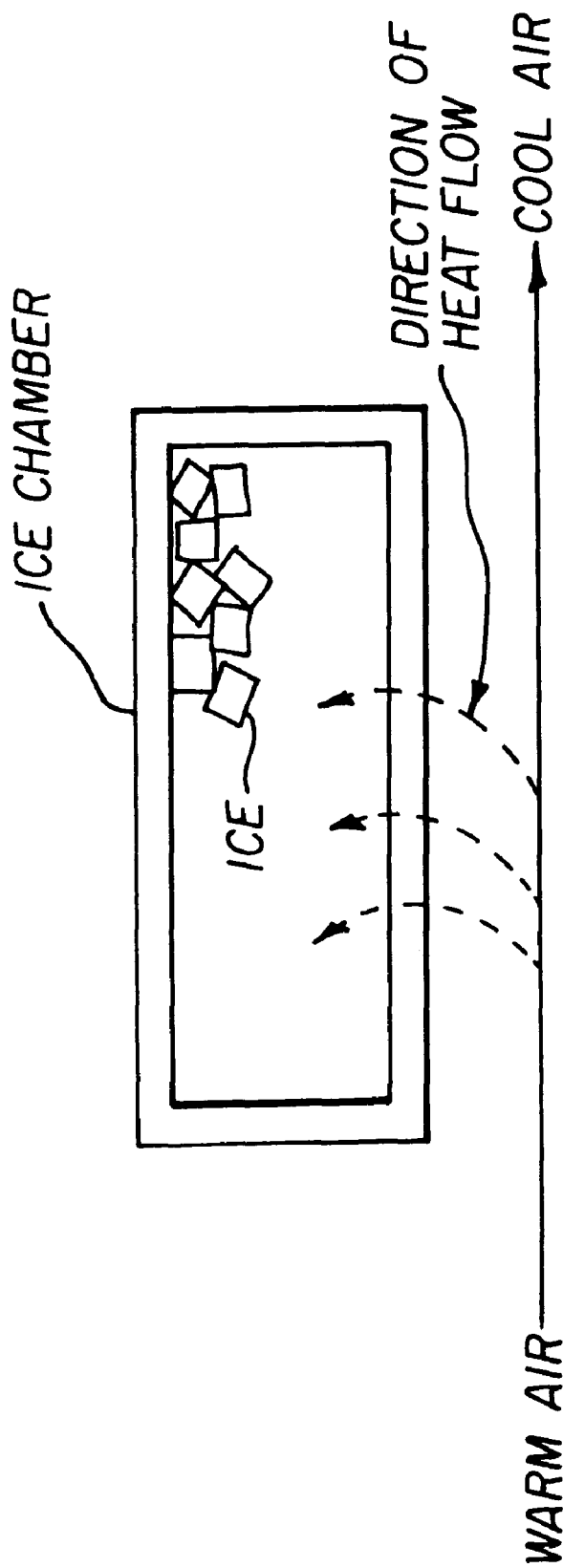
FIGS. 1 and 2 show air conditioning systems known in the prior art.
Figure 2:
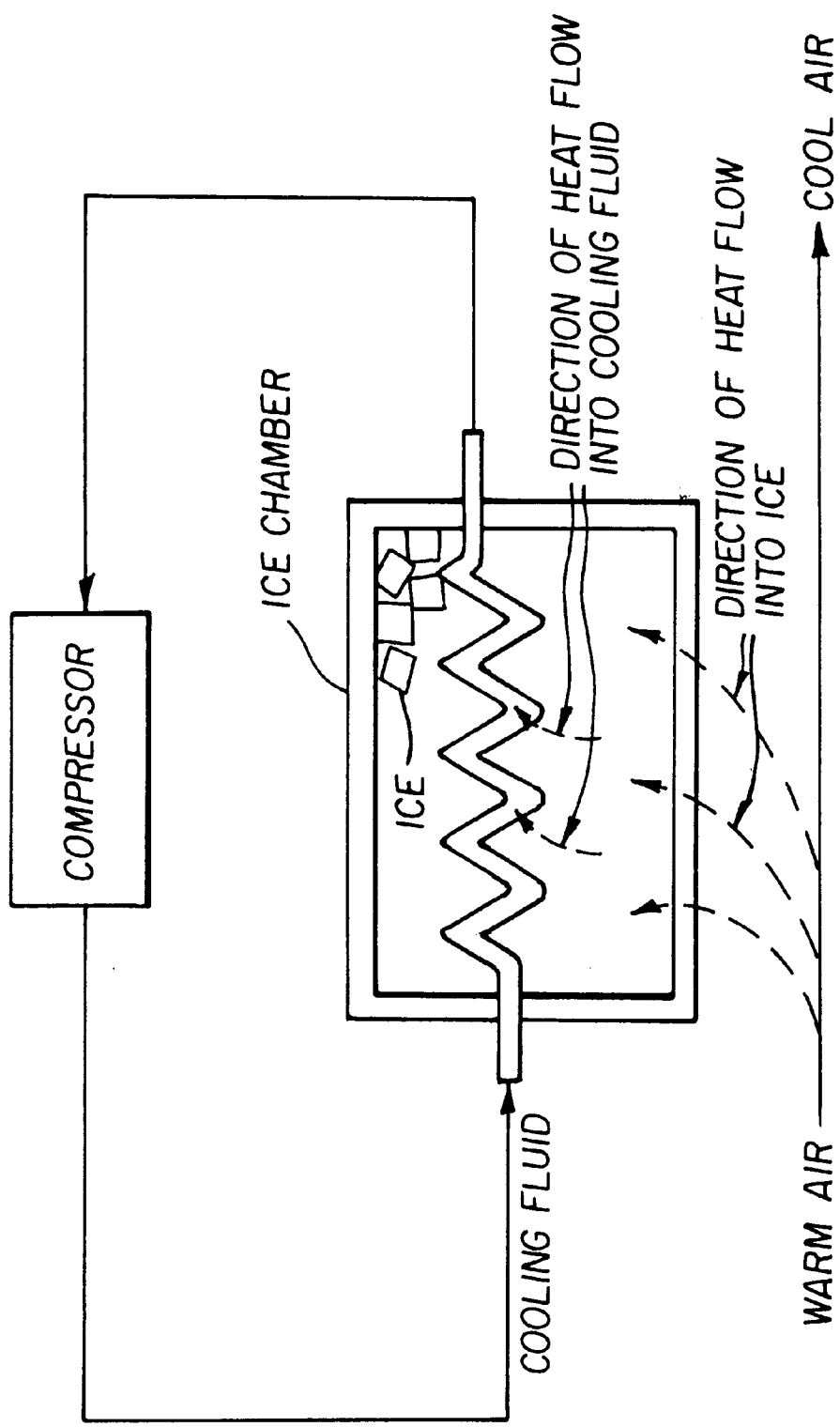
Figure 3:
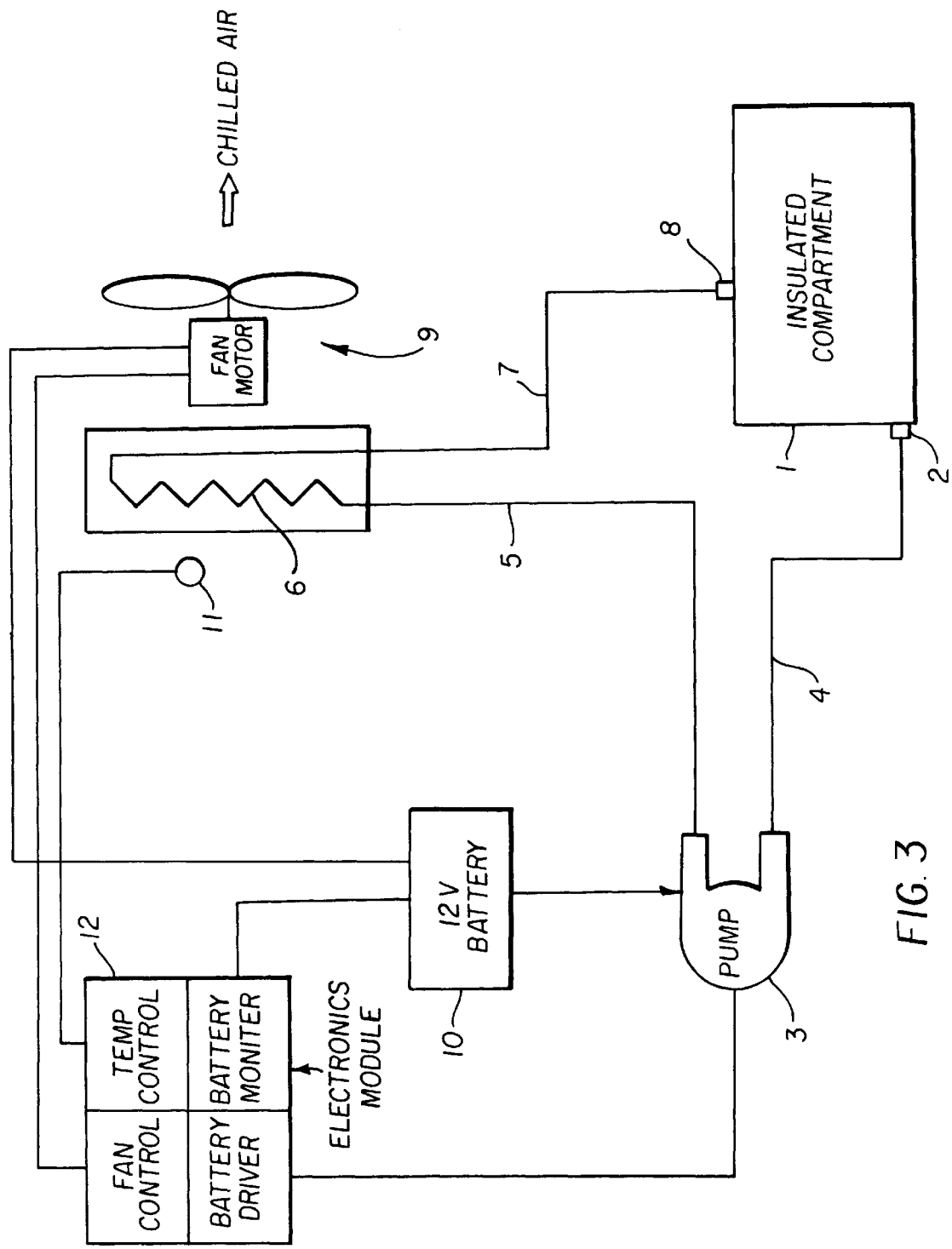
FIG. 3 is a schematic drawing of the inventive air-conditioning system, showing all major parts and their relationship to each other.

A preferred embodiment of the invention of the inventive air conditioning system is shown in FIG. 3. An insulated compartment 1 is used to store frozen material and chilled liquid. The insulated compartment is normally made with a rigid plastic or metal outer shell and a similar rigid inner shell, with a gap filled with an insulating plastic foam between the inner and outer shells. The insulating foam may be a closed cell polyurethane foam. The insulated compartment has a lid covering an opening in the top of the compartment. The lid may be removed to allow frozen material and chilled liquid to be placed in compartment 1 through the top opening. In most cases, the frozen material is ice and the chilled liquid is water. While it is simplest if the liquid and the frozen material are in direct contact, they may be separated by a plastic or metal barrier which allows for efficient heat transfer. There is also a drain in the bottom of compartment 1. The drain is normally closed when the air conditioner is operating; when the air conditioner is turned off, the drain may be opened, allowing liquid to be removed from the compartment.

A circulation loop allows chilled liquid from the compartment 1 to be pumped out of compartment 1, through a cooling coil, and back into compartment 1. A pump 3 draws chilled liquid out of the compartment 1 through first port 2. The amount of chilled liquid in compartment 1 at the start of operation should normally be sufficient to prime the pump. If too little water is used, the pump will not operate properly. However, the operator should not use significantly more water than is required to prime the pump, as this will cause the frozen material to melt more rapidly. The chilled liquid then travels through tube 4 to pump 3. The chilled liquid then leaves pump 3 and is then forced by the pump to travel through tube 5 to a heat exchanger 6. Heat exchanger 6 typically takes the form of a coiled tube having an inner surface and an outer surface, and is made of metal or a similar material which allows free transfer of heat from the inner surface of the heat exchanger to the outer surface. The chilled liquid leaves tube 5, travels through the interior of heat exchanger 6, and exits heat exchanger 6. The chilled liquid then travels through tube 7 and returns to the insulated compartment, re-entering compartment 1 through second port 8.

A motorized fan 9 pulls air from an enclosed cabin across the outer surface of the heat exchanger 6. As the air travels across the heat exchanger, it enters into a heat exchange relationship with the chilled liquid traveling through the interior of the heat exchanger. Heat flows from the air to the chilled liquid, cooling the air and warming the liquid. The cooled air is then returned to the enclosed cabin by the fan 9. The liquid inside the heat exchanger is returned to the insulated compartment, as previously described, where it is again chilled by contact with the ice or other frozen material stored inside compartment 1.

Figure 4:
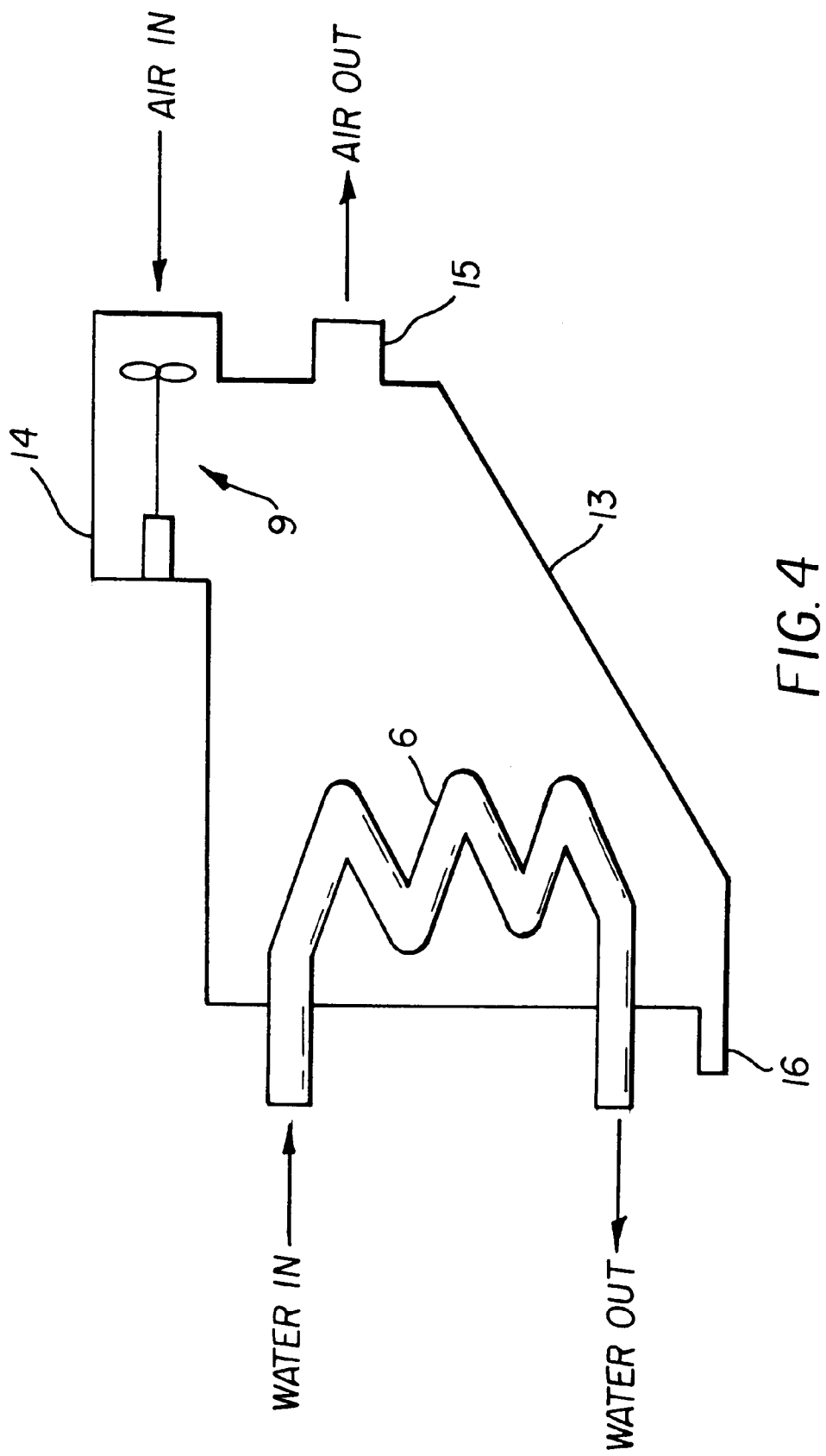
FIG. 4 shows a unit comprising a heat exchanger or cooling coil and a device for blowing air across the cooling coil for use as part of the air conditioning system of this invention.

As shown in FIG. 4, heat exchanger 6 is mounted in an enclosure 13. Air is drawn into the enclosure through air inlet 14 by motorized fan 9. The air inside enclosure 13 contacts the external surface of heat exchanger 6, entering into a heat exchange relationship with the chilled liquid, in this case water, traveling through the interior of heat exchanger 6. As a result, the temperature of the air decreases. As fan 9 draws more air through inlet 14, cooled air is forced to exit enclosure 13 through air outlet 15.

If the air to be cooled is excessively humid, atmospheric moisture condenses onto the external surface of heat exchanger 6 as liquid water, drying the air. This condensed water drains off of heat exchanger 6 and collects at the bottom of enclosure 13. The condensed water is continuously removed from enclosure 13 through drain 16.

The temperature inside the enclosed cabin is monitored by a temperature sensor 11 connected to an electronic computer 12, shown in FIG. 3. If the temperature measured by sensor 11 varies from a predetermined set point selected by the user, the temperature control unit of computer 12 sends a signal to the pump driver unit, which controls the speed of pump 3. If the temperature is too high, the temperature control unit sends a signal causing the pump driver unit to increase pump speed; if the temperature is too low, the temperature control unit sends a signal decreasing pump speed. Fan speed is selected by the user after which it remains constant.

As this system requires no vapor compressor, the power requirements to operate the system are much less than conventional marine air conditioning systems known from the prior art. The pump and the motorized fan may be powered by a single 12 V battery 10, preferably a group 24 or larger marine battery. The computer 12 may be used to monitor the condition of the battery, and alert the operator if the energy level drops below a defined point.

Two prototype units of the air conditioner described herein are operational. One has been installed in a 21' cuddy cabin boat, and the other is in a 19' boat of similar design. The units will keep the cabin at 70° F. and 50% relative humidity for eight or more hours when powered by a single group 24 marine battery and still leave enough reserve power to operate electric lights and to start the boat engines. Ice consumption is about 12 lbs/hour on the 21' boat and 6 lbs/hour on the 19' boat when the ambient environment of 85° F. and 85–90% relative humidity.

What is claimed is:

1. An air conditioning apparatus, comprising:

a) an insulated compartment;

b) a heat exchanger having a first surface and a second-surface;

c) a variable-speed pump adapted to pump a liquid cooling fluid along a defined flow path leading from the insulated compartment, across the first surface of the heat exchanger, and back to the insulated compartment;

d) a means for causing air to flow across the second surface of the heat exchanger in the heat exchange relationship with the cooling fluid;

e) a computer; and f) a temperature sensor adapted to monitor the temperature of air which has flowed across the second surface of the heat exchanger and send a signal to the computer if the air temperature varies from a predetermined set point;

wherein the computer responds to the signal sent by the temperature sensor by varying the speed of the pump; and wherein the cooling fluid is cooled by contact with a slowly melting frozen material stored inside the insulated compartment.

2. The apparatus of claim 1, wherein the cooling fluid is cooled by direct contact with a slowly melting frozen material.

3. The apparatus of claim 1, wherein the cooling fluid is cooled by indirect contact with a slowly melting frozen material.

4. The apparatus of claim 1, wherein the means for causing air to flow across the second surface of the heat exchanger is a fan which blows air across the cooling coil.

5. The apparatus of claim 1, wherein the cooling fluid is water and the frozen material is ice.

6. The apparatus of claim 1, wherein the means for causing a liquid cooling fluid to travel from the insulated compartment is a pump which is powered by a rechargeable battery.

7. The apparatus of claim 6, wherein the means for causing air to flow across the second surface of the heat exchanger is a motorized fan which pulls air across the cooling coil.

8. The apparatus of claim 1, further comprising a means for collecting a liquid condensate which condenses onto the second surface of the heat exchanger from the air traveling across the heat exchanger and carrying the liquid condensate away from the air conditioning apparatus.

9. The apparatus of claim 5, wherein the insulated compartment comprises a drain for removing liquid water from the insulated compartment, and an opening for placing ice and liquid water into the compartment.

\* \* \* \* \*